United States Patent [19]
Graur

[11] Patent Number: 5,579,680
[45] Date of Patent: Dec. 3, 1996

[54] SMOKELESS GRILL FOR INDOOR USE

[76] Inventor: Walter Graur, 1856 Willoughby Ave., Ridgewood, N.Y. 11385

[21] Appl. No.: 446,463

[22] Filed: May 22, 1995

[51] Int. Cl.⁶ ..................................................... A47J 37/04
[52] U.S. Cl. .................. 99/401; 99/385; 99/426; 99/446; 99/447; 99/450; 126/25 R; 126/41 R; 126/275 R; 126/375
[58] Field of Search ................... 99/421 A, 446, 99/447, 444, 449, 419, 421 HH, 400, 425, 375, 482; 126/9 R, 373, 41 R, 30, 299 C, 390, 25 R, 375, 275 R, 273.5

[56] References Cited

U.S. PATENT DOCUMENTS

| | | | |
|---|---|---|---|
| 842,749 | 1/1907 | Baguley | 99/401 X |
| 1,109,831 | 2/1916 | Jeavons | 99/401 X |
| 2,742,850 | 4/1956 | La Fond | 99/401 |
| 2,766,682 | 10/1952 | Smith | 99/419 |
| 3,301,172 | 1/1967 | Haro | 99/446 |
| 4,454,805 | 6/1984 | Matthews | 99/400 |
| 5,156,083 | 10/1992 | Leighton | 99/421 A |
| 5,237,913 | 8/1993 | Hahnewald et al. | 94/389 |
| 5,365,833 | 11/1994 | Chen | 99/447 |

*Primary Examiner*—Timothy F. Simone
*Attorney, Agent, or Firm*—Charles E. Temko

[57] ABSTRACT

A smokeless grill suitable for use upon a conventional gas or electric range in which a lower base element is of shorter longitudinal dimension than a mating cover element which defines a transversely extending horizontal opening adapted to be positioned directly over a gas or electric heating element or burner. Heat emanating from the burner rises under convection as well as radiation to enter the opening and heat air enclosed by the cover. The heated air circulates in a continuous loop between the base element and the cover element to cook food supported upon a grill element disposed therebetween, the configuration of the grill allowing the heated air to pass both above and below the grill. Because no air is introduced into the device, the food cooks essentially without burning or smoking, and all combustion occurs externally of the interconnected base element and cover element.

2 Claims, 1 Drawing Sheet

SMOKELESS GRILL FOR INDOOR USE

BACKGROUND OF THE INVENTION

This invention relates generally to the field of cooking grills used for the barbecuing of meats, fish and poultry, and more particularly to an improved device of this type suitable for use with a single heat source such as a stove burner, electric heating element, and the like.

The cooking of food by barbecuing is commonly performed outdoors using propane or charcoal grills. Such operations are usually accompanied by substantial smoke and odors which, when outdoors, are normally not considered objectionable by the user.

The flavor obtained by such cooking is often quite superior to that obtained by indoor cooking operations such as boiling, frying, baking, and the like, but many stoves do not have provision for broiling, a somewhat equivalent operation. When they do, they are often difficult to clean to a degree which discourages use, unless large quantities of food are being cooked at the same time.

SUMMARY OF THE INVENTION

Briefly stated, the invention contemplates the provision of an improved barbecue grill device suitable for indoor use upon a convention electric or as range and capable of providing the equivalent of barbecued food in the absence of smoke, thus allowing convenient indoor use.

To this end, the disclosed embodiment includes a lower pan element supporting a food cooking surface positioned above the bottom surface thereof, and an upper cover member which in position, encloses the upper edge of the lower pan element on three sides thereof. The cover element is longer than the pan element and extends past an end wall of the pan element to provide a horizontally oriented opening which in use overlies a range burner. Heat rising from the burner enters the opening where it is used to raise the temperature of air beneath the cover element wherein it circulates in a closed loop within the interconnected portion of the cover member and the pan element, both of which are otherwise unvented. The food is thus not subjected to oxidation during cooking, and normally vaporized fats are merely melted to collect upon the lower wall of the pan element without burning due to lack of available oxygen. All combustion occurs externally of the device.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

Figure 1:
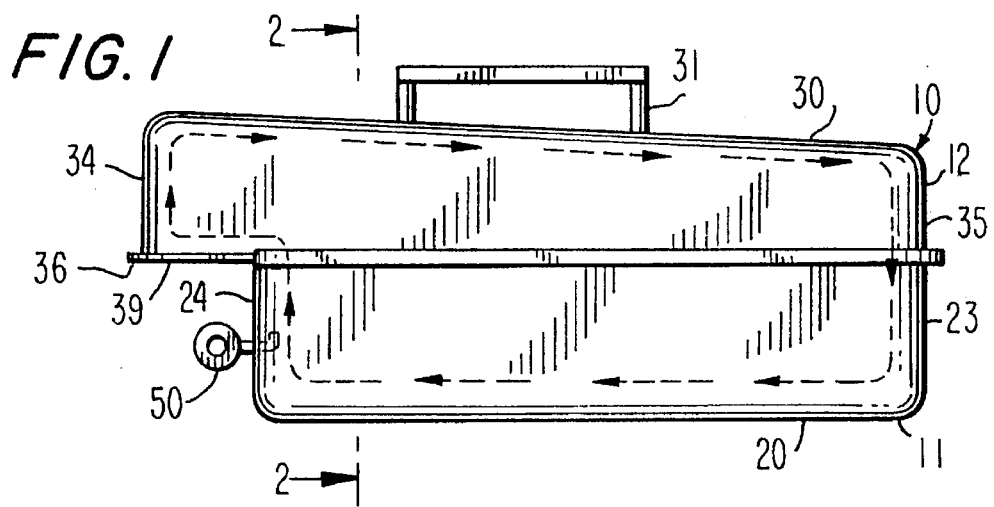
FIG. 1 is a side elevational view of an embodiment of the invention.

In accordance with the invention, the device, generally indicated by reference character 10, comprises broadly: a lower pan element 11, an upper cover element 12, and a food supporting grill 13. The elements 11 and 12 are most conveniently formed as extruded stampings from 20 gauge steel.

The lower pan element 11 includes a lower wall 20, first and second side walls 21 and 22, respectively, as well as first and second end walls 23 and 24. A continuous outwardly extending lip 25 forms a groove 26 for reception of the peripheral edge of the cover element 12, the groove being discontinuous in the area designated by reference character 27.

Figure 2:
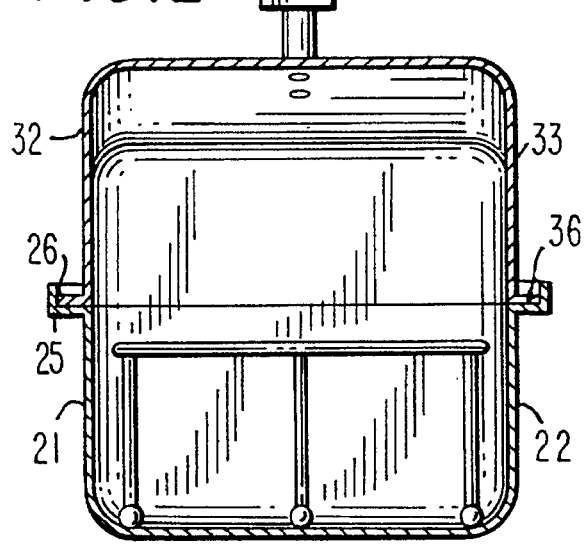
FIG. 2 is a vertical sectional view as seen from the plane 2—2 in FIG. 1.
Figure 3:
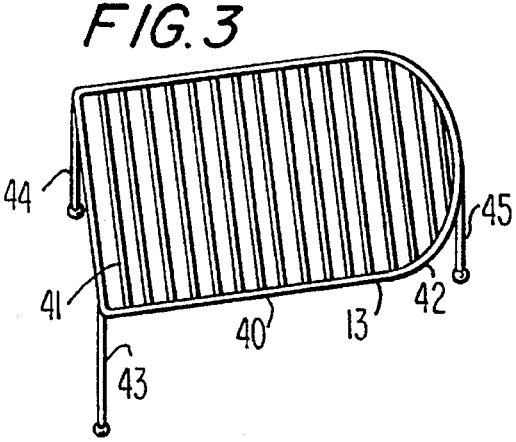
FIG. 3 is a perspective view of a food supporting grill forming a part of the disclosed embodiment.
Figure 4:
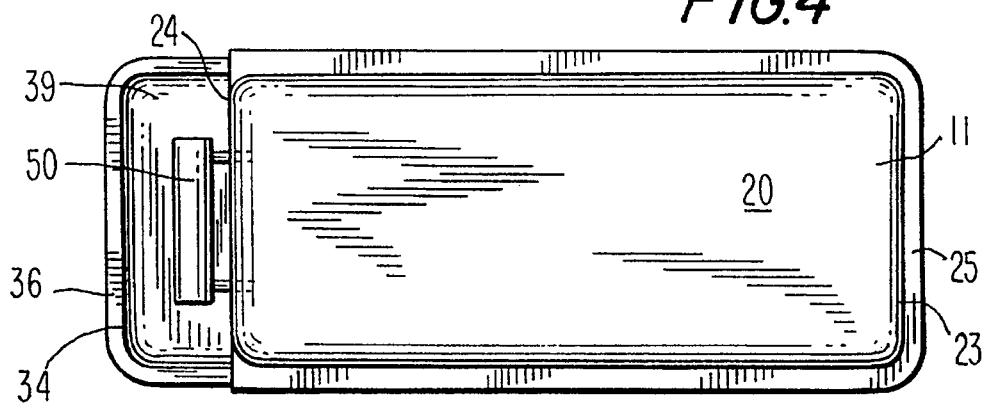
FIG. 4 is a bottom plan view of the embodiment.

The upper cover element 12 includes an upper wall 30 supporting a manually engageable handle 31 as well as first and second side walls 32 and 33 and first and second end walls 34 and 35. As best seen in FIG. 1, the end wall 34 is slightly higher than the end wall 35, principally to serve as identification means for properly positioning the cover element with respect to the pan element. A continuous peripheral edge 36 engages the groove 26 in the manner shown in FIG. 2 wherein the unengaged portion of the edge 36 forms a substantially rectangular opening 39 best seen in FIG. 4.

The food supporting grill 13 may be of conventional construction including a planar wall 40 formed by parallel rods 41 welded to a peripheral rim 42 which also mounts supporting legs 43, 44, and 45 so that the wall 40 is supported above the upper surface of the lower wall 20.

A heat source 50 may be either a gas burner or electric element of a stove. Where the device is supported on the surface of the stove, the opening 39 will be positioned approximately 2½ inches from the burner.

Operation of the device will be apparent from a consideration of FIG. 1 wherein heat rising from the burner initiates a convection path of heated air which circulates between the pan element 11 and the cover element 12. It is to be noted that all combustion takes place externally of the device, so that the circulating heat cooks the food supported upon the grill 13 without enabling the same to burn or otherwise oxidize. Melted fats are collected on the supper surface of the lower wall 20 which will also retain any gravy formed during cooking.

It may thus be seen that I have invented novel and highly useful improvements in smokeless barbecue grills which enable the barbecuing of foods indoors with an absence of smoke and full retention of gravies, fats, and oils without being oxidized.

The device is relatively simple to fabricate, and readily cleaned after use.

I wish it to be understood that I do not consider the invention to be limited to the precise details of structure shown and set forth in the specification, for obvious modifications will occur to those skilled in the art to which the invention pertains.

I claim:

1. An improved smokeless grill for use in conjunction with an external source of heat comprising: a lower pan element including a bottom wall, an upper cover element, means for supporting articles of food above said lower wall; said pan element and cover element being of generally rectilinear configuration and having interfitting peripheral edges along three sides thereof to provide a partially sealed enclosed space; said cover element being longer than said pan element along a principal axis thereof, so that when said pan element and said cover element are mutually engaged, a portion of said cover element periphery defines a generally rectangular opening leading to said enclosed space; whereby, an externally supplied heat source upon being positioned beneath said opening formed by said cover element causes a heating and recycling of air within said enclosed space to form a closed circuit.

2. A grill in accordance with claim 1, in combination with an externally disposed heat source.

* * * * *